United States Patent [19]

Usui

[11] Patent Number: 4,893,657

[45] Date of Patent: Jan. 16, 1990

[54] STRUCTURE OF THE CONNECTING END PORTION OF COMPOSITE TUBE HAVING SMALL DIAMETER

[75] Inventor: Masayoshi Usui, Numazu, Japan

[73] Assignee: Usui Kokusai Sangyo Kabushiki Kaisha, Shizuoka Prefecture, Japan

[21] Appl. No.: 301,659

[22] Filed: Jan. 25, 1989

Related U.S. Application Data

[63] Continuation of Ser. No. 125,556, Nov. 25, 1987, abandoned.

[51] Int. Cl.$^4$ .............................................. F16L 35/00
[52] U.S. Cl. .................................. 138/109; 138/178; 285/333; 285/334.5
[58] Field of Search ............... 138/103, 109, 177, 178; 285/328, 329, 332, 332.1, 332.2, 332.3, 332.4, 333, 334.5

[56] References Cited

U.S. PATENT DOCUMENTS 3,830,262 8/1974 Lago .

FOREIGN PATENT DOCUMENTS 916311 12/1946 France .
1451391 7/1966 France .
1036950 7/1966 United Kingdom .

*Primary Examiner*—James E. Bryant, III
*Attorney, Agent, or Firm*—Anthony J. Casella; Gerald E. Hespos

[57] ABSTRACT

A composite tube having a small diameter consists of a thin metal tube having a small diameter and a resin tube closely fitted on the outer periphery of the metal tube. The connecting end portion of the composite tube has a coaxial and outwardly opening flare which is formed integrally with the composite tube. A metal sleeve washer having substantially the same shape as that of the composite tube with the flare is fitted on the outer periphery of the composite tube.

6 Claims, 1 Drawing Sheet

PRIOR ART

STRUCTURE OF THE CONNECTING END PORTION OF COMPOSITE TUBE HAVING SMALL DIAMETER

This application is a continuation of Ser. No. 125,556, filed on Nov. 25, 1987.

BACKGROUND OF THE INVENTION

1. Field of the Invention:

The present invention relates to an improved structure of a connecting end portion of a thin metal tube with a resin tube closely fitted on the periphery along its entire length which has a relatively small diameter of 20 m/m or less and is mainly used as a passage of oil or air in automobiles, various machines, and equipment.

2. Description of the Prior Art:

It is known to use a thin metal tube with a resin tube closely fitted on the periphery along its entire length as a brake pipe, a fuel pipe, or a vacuum pipe for an automobile from the viewpoint of improvement of anticorrosion, reduction in weight of the product, and the readiness of provision. FIG. 2 shows an example of a known connecting end portion structure. A composite tube 11 consists of a thin metal tube 13 and a resin tube 12 closed fitted on the periphery along its entire length. The connecting end portion of the composite tube 11 is provided with a a coaxial and outwardly opening flared portion 14 whose back 15 is directly pressed by the distal end of a nut N' when the nut is threadedly engaged. Reference numeral 16 denotes a neck portion.

With the above-described arrangement of the connecting end portion of the composite tube, since the resin layer on the back surface 15 of the flared portion 14 is directly pressed by the threadedly engaged nut N', that resin layer may be damaged, this often leading to the failure of reuse of the disassembled composite tube. Further, the neck portion 16 may be fatigued by means of torsional stress, resulting in a crack or breakage thereof, if the composite tube is used in a vibrated state.

SUMMARY OF THE INVENTION

Accordingly, an object of the present invention is to provide a connecting end portion structure which can eliminate possibility of damage of the resin layer on the back of a flared portion caused by the threaded engagement of a nut, and which can reduce the torsional stress applied to the neck portion and prevent occurrence of crack or breakage by increasing the mechanical strength of the vicinity of the neck portion.

To this end, the present invention provides a structure of a connecting end portion of a small diameter composite tube consisting of a thin metal tube having a small diameter and a resin tube closely fitted on the outer periphery of the metal tube, the connecting end portion having a coaxial and outwardly opending flare which is formed integrally with the composite tube, which is characterized by the inclusion of a metal sleeve washer mounted at the back of the flare in such a manner that a trumpet-like open wall portion provided at the distal end of the sleeve washer abuts against the back of the flare and that a cylindrical wall portion fits on the outer periphery of the end portion located adjacent to a neck portion of the flare.

DETAILED DESCRIPTION OF THE PREFERRED EMBODIMENT

Figure 1:
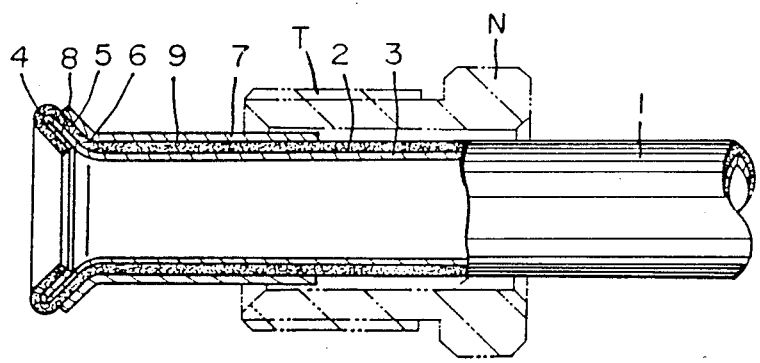
FIG. 1 is a cross-sectional view, with portions cut away, of a structure of a connecting end portion of a composite tube having a small diameter, showing a first embodiment of the present invention.
Figure 2:
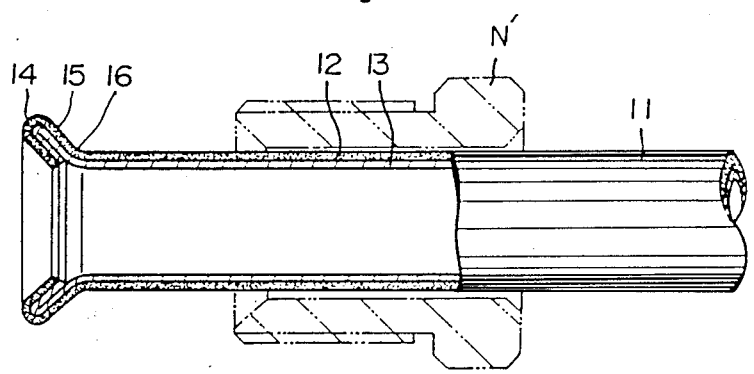
FIG. 2 is a cross-sectional view, with portions cut away, of a known connecting end portion structure.

An embodiment of the present invention will be described below with reference to FIG. 1 which is a cross-sectional view, with portions cut away, of the structure of the connecting end portion of a small diameter composite tube according to the present invention. A composite tube 1 consists of a tube 3 made of a thin metal, such as steel, aluminum or stainless steel, which has a wall thickness of about 1.5 m/m or less, the tube 3 having a diameter of about 20 m/m or less, and a resin tube 2 made of a desired material, the resin tube 2 being closely fitted on the outer periphery of the thin metal tube 3 along its entire length. The composite tube 1 has at its connecting end portion a single- or doubled-skinned flared portion 4 which is coaxial with the other portion of the composite tube and is opened outward. A metal sleeve washer 7 which has a trumpet-like open wall portion 8 and a cylindrical wall portion 9 is mounted on the composite tube 1 at the back of the flared portion in such a manner that its open wall portion 8 provided on the distal end of the sleeve washer 7 abuts against the back of the flared portion 4 and that the cylindrical wall portion 9 is closely fitted on the outer periphery of the end portion located adjacent to a neck portion 6 of the flared portion. In other words, the metal sleeve washer 7 has substantially the same shape as that of the composite tube 1 with the flared portion 4. It is made of the same material as that of the thin metal tube 3, and has substantially the same wall thickness as that of the tube 3. Reference symbol N denotes a nut which is incorporated in the composite tube 1. The nut N includes an array of threads T which enable the nut N to be tightened with its distal end pressing against the open wall portion 8 of the metal sleeve washer 7, as it is threadedly engaged with a bolt.

As stated before, the distal end of the nut N presses against the open wall portion 8 of the metal sleeve washer 7, according to the present invention. Therefore, the frictional resistance caused at the back 5 of the flare 4 by the threaded engagement of the nut N can be reduced by the provision of the open wall portion 8, resulting in the protection of the resin layer to a sufficient degree. Further, torsional stress applied to the neck portion 6 can be reduced, and the mechanical strength at the vicinity of the neck portion can be increased by the provision of the sleeve washer which serves as a washer.

As will be understood from the foregoing description, since the structure of the connecting end portion of the composite tube having a small diameter includes the metal sleeve washer mounted at the back of the flared portion 4 in such a manner that the trumpet-like open wall portion 8 of the sleeve washer abuts against the back of the flared portion 4 and that the cylindrical wall portion 9 fits on the periphery of the end portion located adjacent to the neck portion 6, possibility of the damage of the resin layer on the back 5 of the flared portion 4 can be eliminated by the provision of the open wall portion 8, enabling the disassembled composite tube to be reused. Further, occurrence of crack or breakage of the vicinity of the neck portion 6 can be prevented for a long period of time by the provision of the sleeve washer and the resultant increase in the mechanical strength.

What is claimed is:

1. A reconnectable structure of a connecting end portion of a small diameter composite tube consisting of a thin metal tube having a small diameter and a resin tube closely fitted on the outer periphery of said metal tube and extending substantially along the entire length thereof, the metal and resin tubes being substantially cylindrical and of uniform respective thicknesses adjacent the connecting end portion, said connecting end portion having a coaxial and outwardly opening flare which is formed integrally with said composite tube and with the metal and resin tube portions along said outwardly opening flare being of uniform respective thickness, characterized by the inclusion of:

a metal sleeve washer having a uniform radial thickness substantially equal to the thickness of the metal tube fitted on the outer periphery of said composite tube, said metal sleeve washer and said thin metal tube being formed from the same metal material, said metal sleeve washer having substantially the same shape as that of said composite tube with said flare and comprising a trumpet-like open wall which is contacted with the outer surface of said flare, and a cylindrical wall fitted on the outer periphery of the cylindrical portion of said composite tube adjacent to said flare, a nut having a central cylindrical through aperture surrounding the cylindrical wall of the metal sleeve washer, said nut having a flared entry to said through aperture, said flared entry conforming to the shape of and engaging the trumpet-like wall of said metal sleeve washer, whereby said metal sleeve washer prevents friction related damage to the resin tube and further increases the strength of the connecting end portion thereby reducing torsional stress and preventing breakage such that said metal sleeve washer increases the life and enables reuse of said structure.

2. A reconnectable structure according to claim 1, wherein said metal sleeve washer and said thin metal tube are made of steel, aluminum, or stainless steel.

3. A reconnectable structure according to claim 1, wherein said metal sleeve washer and said thin metal tube have a wall thickness of 1.5 m/m or less.

4. A reconnectable structure according to claim 1, wherein said thin metal tube has a diameter of 20 m/m or less.

5. A reconnectable structure according to claim 1, wherein the cylindrical wall of said metal sleeve washer defines a length substantially equal to or greater than the length of the central cylindrical through aperture of said nut.

6. A reconnectable structure as in claim 1, wherein said nut comprises thread means for enabling selective reconnection of said reconnectable structure to another structure.

* * * * *